(12) United States Patent
Seidel

(10) Patent No.: US 12,347,991 B2
(45) Date of Patent: Jul. 1, 2025

(54) CURRENT COLLECTOR

(71) Applicant: Conductix-Wampfler GmbH, Weil am Rhein (DE)

(72) Inventor: Dieter Seidel, Steinen (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 910 days.

(21) Appl. No.: 17/510,237

(22) Filed: Oct. 25, 2021

(65) Prior Publication Data
US 2022/0131325 A1    Apr. 28, 2022

(30) Foreign Application Priority Data
Oct. 23, 2020   (DE) ..................... 10 2020 127 969.8

(51) Int. Cl.
*H01R 41/00*   (2006.01)
*H01R 13/24*   (2006.01)

(52) U.S. Cl.
CPC ......... *H01R 41/00* (2013.01); *H01R 13/2407* (2013.01)

(58) Field of Classification Search
CPC ......... H01R 4/00; H01R 13/2407; B60L 5/00; B60L 5/04; B60L 5/38
See application file for complete search history.

(56) References Cited

U.S. PATENT DOCUMENTS

2012/0303193 A1   11/2012   Gresser

FOREIGN PATENT DOCUMENTS

| CN | 212861102 U | 4/2021 | |
| DE | 18583 A1 | 4/1960 | |
| DE | 7419024 U | 9/1974 | |
| DE | 3124849 A1 | 1/1983 | |
| JP | 5977333 B2 | 8/2016 | |
| WO | WO-2012143357 A2 * | 10/2012 | ................ B60L 5/22 |

OTHER PUBLICATIONS

Result of examination report for German Patent Application No. 10 2020 127 969.8, filed Oct. 23, 2020.
Search Report dated Mar. 22, 2022 for European Patent Application No. 21204130.5.

* cited by examiner

*Primary Examiner* — Robert J McCarry, Jr.
(74) *Attorney, Agent, or Firm* — Paul D. Bianco; Stephen Bongini; Fleit Intellectual Property Law

(57) ABSTRACT

A current collector supplies power to an electrical load movable along a conductor line and includes a movable holder for a contact element whose range of movement is restricted by two mechanical stops, and which is acted upon by a spring arrangement exerting a force in the direction of a first end of its range of movement to force the contact element against a power rail. A damping device is provided, which dampens movement of the holder caused by the spring arrangement in the direction of the first end of its range of movement, when the holder is situated within a predetermined first section of its range of movement, which is restricted on one side by the first end and does not include the entire range of movement. The damping device can be designed as a flow damper or a friction damper or as at least one spring element.

12 Claims, 2 Drawing Sheets

CURRENT COLLECTOR

FIELD OF THE DISCLOSURE

The disclosure relates to a current collector.

BACKGROUND

Current collectors of conductor line systems for power supply to electrical loads movable along a conductor line are frequently exposed to dynamic loading during operation. There are applications in which the current collectors of the moving load are only temporarily in use, i.e., only along part of the entire path of movement of a load, as is common, for example, in sorting plants. This produces the problem of special loading of the current collector when introduced to a line section in which it is in use, on leaving such a line section and in a line section in which it is not in use.

Loading during entry is now reduced by long funnels by means of which the current collector is trapped and continuously guided into its operating position and engaged with the conductor line via a flat ramp. No such funnels are ordinarily used for withdrawal so that, when withdrawn, the current collector is cast from the end of a conductor line and strikes a mechanical stop that restricts the range of movement thereof. During subsequent movement of the load with no contact between the current collector and the conductor line, the current collector is exposed to increased vibrational loading.

Another type of dynamic loading of a current collector occurs when there is a change in distance between a moving load and the conductor line laid along its path of movement. In particular, a reduction of said distance regularly occurs at curves, as a result of which the pressing force is unnecessarily increased during ordinary generation of the pressing force of the current collector against the power rails of the conductor line by means of a normal spring.

Such dynamic loading during changes in the operating state contribute significantly contribute to the wear and tear of the current collector mechanism.

SUMMARY

One aspect of the disclosure relates to reducing the dynamic loading of the current collector mechanism during changes in its operating state.

Accordingly, embodiments of a current collector are disclosed herein.

According to the disclosure, a current collector for power supply to an electrical load movable along a conductor line with a movable holder for a contact element, whose range of movement is restricted by two mechanical stops, and which is acted upon by a spring arrangement exerting a force in the direction of a first end of its range of movement so as so as to force the contact element against a power rail of the conductor line, is characterized in that a damping device is provided, which dampens movement of the holder caused by the spring arrangement in the direction of the first end of its range of movement, if the holder is situated within a predetermined first section of its range of movement, which is restricted on one side by the first end and does not include the entire range of movement.

In installations in which a conductor line is only laid in sections along the path of movement of a moving load, this prevents the moving part of the current collector, when it exits the conductor line, from being thrown forcefully against the mechanical stop that restricts the range of movement of the holder of the contact element by means of the spring arrangement that furnishes the force to press the contact element of the current collector against the power rails of the conductor line. During further movement in a path section in which there is no contact between the current collector and a conductor line, the vibration of the current collector on its mechanical stop is then dampened by the damping element. Mechanical loading of the current collector and the wear and tear of the current collector mechanism resulting therefrom are significantly reduced by damping.

The damping device can advantageously be designed in the form of a flow damper or a friction damper of a type known per se or also in the form of at least one spring element, in which case a buffer element made of elastomer can also be used as the spring element.

The predefined first section of the range of movement of the holder is preferably connected to second section and a third section connected is thereto, in which case the third section extends to the second end of the range of movement opposite the first one, and the stiffness of the spring arrangement in the third section is less than in the second section. An unnecessarily high pressing force of the contact element against the power rail of the conductor line is thereby avoided in the third section with a significant reduction of the distance between the moving load and the power rail, as occurs during curved travel.

The spring arrangement can have at least two springs mechanically connected to each other in parallel, at least one of which is active over the entire range of movement of the holder and at least one of which is active in the second section of the range of movement and inactive in the third section. This is a particularly simple and therefore expedient way to implement a spring arrangement with two displacement ranges of different stiffness, as is desired in the present application. In this case the spring active in the second section and inactive in the third section and the spring active over the entire range of movement of the holder can have different stiffnesses in order to create an additional degree of freedom for optimal adjustment of the resulting spring characteristic of the spring arrangement.

A simple and particularly advantageous form for implementing the spring active in the second section and inactive in the third section is a pneumatic spring. Such a pneumatic spring preferably has a chamber with a variable volume dependent on the displacement of the spring, in which a gas is compressed during a displacement by means of which the spring force is increased and the chamber has an outlet opening that is opened at a predetermined extent of displacement so that the pneumatic spring becomes inactive when this amount of displacement is surpassed. The abrupt deactivation of the spring can be achieved in this way by simple means and without the use of costly electronic and electromechanical components.

As an alternative to parallel connection of at least two springs, at least one of which becomes inactive at a certain displacement, the spring arrangement can also have at least one stack of Belleville springs. A degressively nonlinear spring characteristic can thereby also be produced, as is to be provided according to the disclosure at the second end of the range of movement of the contact element.

A simple and therefore particularly expedient design of a current collector according to the disclosure consists of the fact that it has a first pivot bearing with a first axis, by which a lever is rotatably connected between the two mechanical stops to a support fastened to the moving load, and that it has a second pivot bearing with a second axis, by which the holder of the contact element is connected to the lever, the first axis and the second axis lying parallel to each other. In this case, the spring arrangement can act upon the lever exerting a force in the direction of increasing distance of the holder of the contact element from the support in order to provide the pressing force for the contact element against the power rail of the conductor line.

BRIEF DESCRIPTION OF THE DRAWINGS

The disclosure is described below by means of detailed illustrative embodiments with reference to the accompanying drawings. In the drawings.

DETAILED DESCRIPTION

Figure 1:
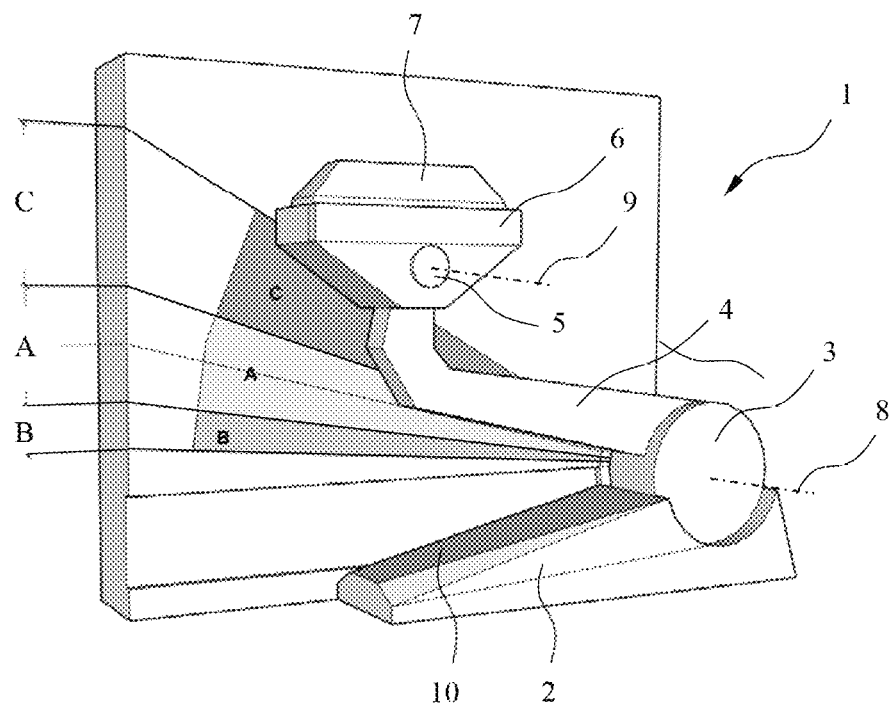
FIG. 1 shows a schematic three-dimensional oblique view of a current collector according to the disclosure with an indication of different sections of its range of movement.

As shown in FIG. 1, the essential components of a possible embodiment of a current collector 1 according to the disclosure are a support 2, a first pivot bearing 3, a lever 4, a second pivot bearing 5 and a holder 6, to which a contact element 7 is fastened. The lever 4 is rotatably mounted on the support 2 by the first pivot bearing 3 and extends therefrom to the second pivot bearing 5, through which the holder 6 of the contact element 7 is mounted to rotate on lever 4, in which case the axes of rotation 8 and 9 of the two pivot bearings 3 and 5 lie parallel to each other. The contact element 7 is electrically conductive and connected via a feed line to an electrical load that can be forced to move along a predetermined path. The support 2 is fastened to the moving load, which is not shown in the figures.

During simultaneous rotations of both pivot bearings 3 and 4 in opposite directions the holder 6 together with contact element 7 can be raised or lowered relative to support 2, in which case the top of contact element 7, which during operation lies against a power rail of a conductor line not shown in the figures, can also slope so that flat contact between the top of contact element 7 and the power rail of the conductor line is maintained continuously during continuous changes in distance between support 2 and the conductor line along the path of movement of the load.

The range of movement of lever 4 relative to support 2 is restricted by two mechanical stops within pivot bearing 3 (not shown in FIG. 1). The same also applies for the range of movement of holder 6 relative to lever 4 as created by the pivot bearing 5, in which the range of movement of holder 6 is determined by the range of movement of lever 4 relative to support 2 owing to the overall length of lever 4.

The force for pressing the top of contact element 7 against a power rail of a conductor line is generated by a spring arrangement in pivot bearing 3, which is supported on support 2 and exerts a force on lever 4, which in the absence of a counterforce of the power rail in FIG. 1, moves it clockwise against a first of the two mechanical stops. Due to the counterforce of the power rail, which is transferred to lever 4 during operation of the current collector 1 on a conductor line via the top of the contact element 7, holder 6 and pivot bearing 5, the lever 4 is held in a middle area of its range of movement restricted by the two stops, i.e., in a middle area of its angle relative to top 10 of support 2 (marked A in FIG. 1).

The region marked C in FIG. 1, in which the angle between lever 4 and the top 10 of support 2 is greater than in region A, is reached by lever 4 when the counterforce of the power rail disappears, i.e., when the moving load enters a section of its path of movement in which no conductor line is laid. This region C is bounded by the first mechanical stop, against which the lever 4 strikes as a result of the force of the spring arrangement.

The region marked B in FIG. 1, in which the angle between lever 4 and the top 10 of support 2 is smaller than in the region A, is then reached by lever 4 when the distance between the moving load to which support 2 is fastened and the conductor line is abnormally reduced, as may be the case, for example, during curved travel of the current collector 1. This region is bounded by a second mechanical stop.

According to the disclosure a damping device is provided, which is only active in region C in which the counterforce of the power rail on lever 4 is missing. This damping device dampens movement of lever 4 when it is accelerated by the force of the spring arrangement in the direction of the first stop by an abrupt disappearance of the counterforce of the power rail, as occurs when the current collector 1 leaves one end of the conductor line. Forceful striking of the lever 4 against the first stop is prevented by this damping and the mechanical loading that leads to wear and tear over time, especially of the pivot bearings 3 and 5, is decidedly reduced.

According to the disclosure, in order to reduce mechanical loading of the current collector during other operating states, different stiffnesses of the spring arrangement are provided in areas A and B, i.e., the stiffness of the spring arrangement is less in area B, which is limited by the second stop on one end, than in the normal operating area A. As a result of this lower stiffness in end area B, an excessive rise in pressing force between the contact element 7 and the power rail of the conductor line, which would also result in a corresponding load on the pivot bearings 3 and 5 that transfer this force, is prevented during an abnormal reduction in distance between the load the conductor line.

Figure 2:
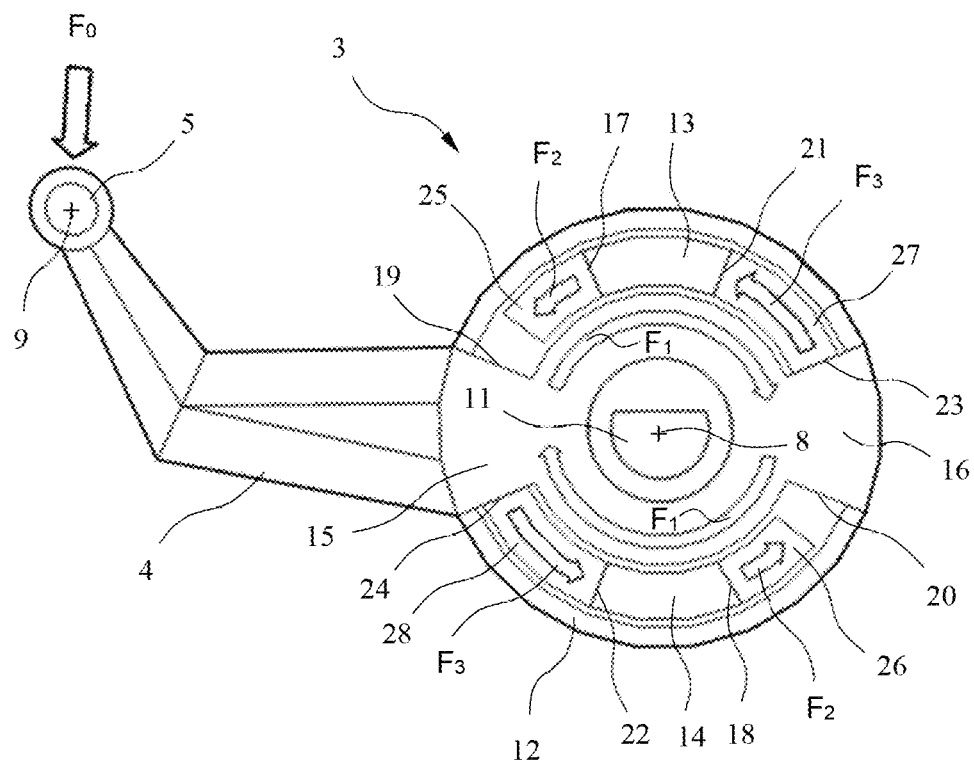
FIG. 2 shows a schematic side view of part of a current collector according to the disclosure.

FIG. 2 shows one possible implementation of the functions of the disclosure just explained in schematic form. Only the pivot bearings 3 and 5, as well as lever 4, on which the counterforce $F_0$ of the power rail acts via pivot bearing 5 are shown here in a side view. Lever 5 is fastened to a shaft 11 of pivot bearing 3, which is mounted to rotate on a bearing block 12 of pivot bearing 3 around the axis of rotation 8 thereof. The bearing block 12 has two axial protrusions 13 and 14 opposite each other in radial symmetry, which cover the axial area of the pivot bearing 3 in which lever 4 is arranged. In the area of bearing block 2, this has the shape of a circle with a center cutout for shaft 11 and with two brackets 15 and 16 opposite each other with radial symmetry, in which an angled part of the lever 4 extends from the first bracket 15 to the other pivot bearing 5.

As a result, in the peripheral direction of pivot bearing 3, radial stop surfaces 17 and 18 on the protrusions 13 and 14 of bearing block 12 are opposite corresponding radial stop surfaces 19 and 20 on the brackets 15 and 16 of lever 4, which together form a stop for rotational movement of lever 4 clockwise, by which its angle relative to top 10 of support 2 is increased. In the peripheral direction of pivot bearing 3, two radial stop surfaces 21 and 22 on protrusions 13 and 14 of bearing block 12 are also opposite corresponding radial stop surfaces 23 and 24 on the brackets 16 and 15 of lever 4, which together form a stop for rotational movement of lever 4 counterclockwise, by which its angle relative to top 10 of support 2 is reduced.

To exert a pressing force of contact element 7 against the power rail of the conductor line, which is in equilibrium with the counterforce $F_0$, a spring arrangement is provided with a first spring that exerts a total force $F_1$ acting on lever 4, which generates a clockwise torque acting on lever 4. This spring itself is not shown in FIG. 2, but merely symbolized by two arrows indicating the direction of the force $F_1$ exerted thereby. In particular, this can be a torsion spring, or a tightened coil spring, whose center axis is the axis 8 of pivot bearing 3. Springs of this type are known per se and require no detailed description.

In order to prevent the lever 4 from accelerating when the counterforce $F_0$ disappears after current collector 1 leaves the end of a conductor line by force $F_1$ and to prevent the stop surfaces 19 and 20 of lever 4 from striking the stop surfaces 17 and 18 of bearing block 12 unbraked, a damping device is provided, consisting of two damping elements 25 and 26, the first of which is arranged in front of the stop surface 17 of protrusion 13 and the second in front of the stop surface 18 of protrusion 14. The damping elements 25 and 26 together generate a damping force $F_2$ upon contact with the stop surfaces 19 and 20 of lever 4, which is directed against the force $F_1$ of the first spring and causes braking of the movement of lever 4 before it comes in contact with the stop surfaces 17 and 19 or 18 and 20, whereby forceful abrupt loading of the pivot bearing 3 is avoided.

In the simplest case, the damping elements 25 and 26 can be spring elements, such as buffer elements made of elastomer. However, a friction damper or a flow damper of a type known per se can also be provided instead of two spring elements.

As is apparent from FIG. 2, a distance between the stop surfaces 19 and 20 of lever 4 and the damping elements 25 and 26 exists in the normal position of lever 4, as shown, so that the latter only become active after a certain minimum displacement of the lever 4 from its normal position. The distance is dimensioned so that the damping elements 25 and 26 still do not enter into action during a slight deviation from the normal position (to be expected during operation of the current collector 1), which can occur over time, among other things, from wear and tear of the contact element 7. This normal position of lever 4 is shown in FIG. 1, in which it is situated at the center of the area marked A. The area in which the damping elements 25 and 26 are active is the area marked C.

In the opposite direction of rotation of lever 4, the first spring dampens its movement, if a reduction in distance between support 2 and the power rail of the conductor line occurs. In order to guarantee both a sufficient damping effect in the normal range of fluctuation of said distance in this case, and also in the case of a reduction in said distance extending beyond the normal range of fluctuation and to avoid excessive increase in forces $F_0$ to $F_1$, a second spring could be connected that exerts a force on lever 4 that is directed against the force $F_1$ of the first spring but is smaller than the first force $F_1$. The second spring would therefore mechanically counteract the first spring when the displacement of the latter exceeds a certain amount, i.e., when lever 4 moves from area A into area B.

Connection of an auxiliary spring whose force is directed against the direction of force $F_1$ could be achieved, for example, based on an angle sensor that detects the displacement of lever 4, an electronic control and an electromechanical actuator, which, however, would be associated with an unreasonably large amount of effort. A simpler solution consists in mechanically connecting at least two springs in parallel with each other so that their forces combine and in having one of these springs become inactive during a displacement of a predetermined extent, which is possible with purely mechanical means and without using electronic and electromechanical components. Such a solution is described below with reference to FIG. 3.

Figure 3:
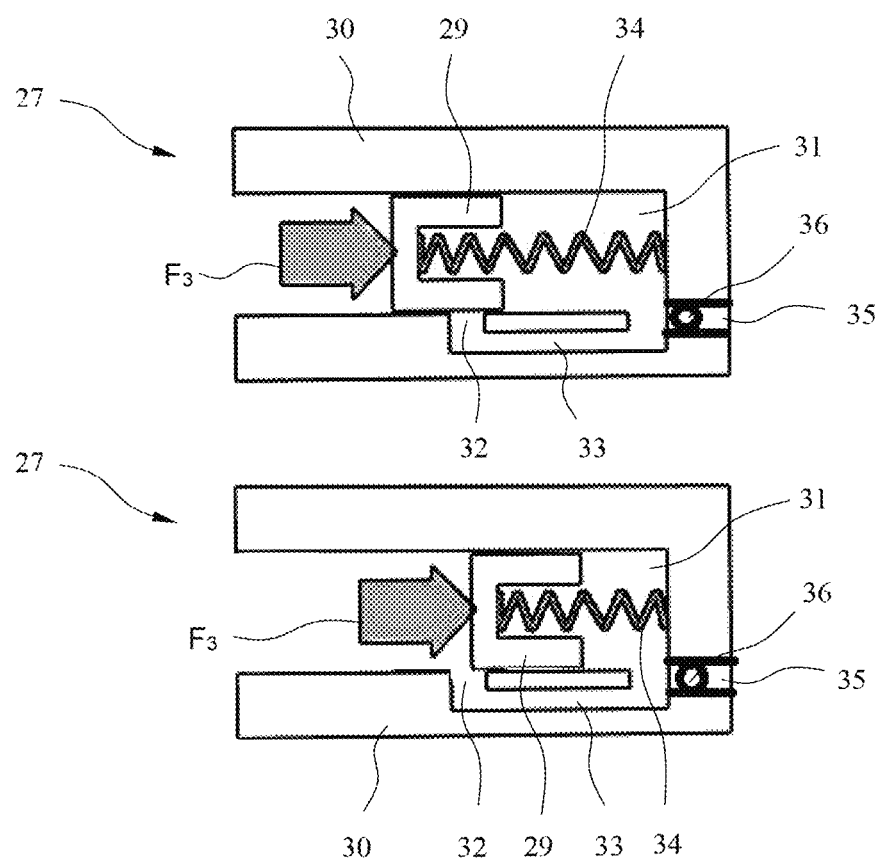
FIG. 3 shows schematic longitudinal views of a damping element of the current collector according to the disclosure in two different operating positions.

FIG. 3 shows an auxiliary spring 27, which is provided as a dual component of the spring arrangement of the current collector of FIG. 2, i.e., a second identical spring 28 is provided here. Both springs 27 and 28 are supported on an axial protrusion 13 and 14 and are acted upon with force by a support surface 23 or 24 of a bracket 15 or 16 of lever 4 when lever floor is displaced counterclockwise. The total force exerted by the spring arrangement on lever 4 therefore consists additively of the force $F_1$ of a first spring not shown in FIG. 2, which can be a torsion spring, for example, and the force of two auxiliary springs 27 and 28, which, according to the disclosure, can be designed in the form of pneumatic springs, as will be explained below.

During a displacement in the form of a counterclockwise rotation, as in FIGS. 1 and 2, i.e., support 2 of the current collector 1 approaches the power rail of the conductor line, the lever 4 exerts a force $F_3$ via the stop surface 23 on a piston 29, which is movably guided in a cylinder 30. Since the lever 4 executes a rotational movement and the piston 29 executes a linear movement, the stop surface 23 is connected in known fashion via a linkage not shown in FIG. 3, which permits conversion of the rotational movement of lever 4 into a linear movement of piston 29. The piston 29 together with cylinder 30 defines a chamber 31 in which a gas volume is enclosed, which is compressed during movement of piston 29 into the cylinder 30 and thereby generates a reaction force directed against force $F_3$. This mode of operation of a pneumatic spring is known per se. The gas in chamber 31 is preferably air.

The distinguishing feature of the pneumatic auxiliary springs 27 and 28 according to the disclosure is that an outlet opening 32 is provided on the inside of cylinder 30, with which an inner end area of chamber 31 is connected via a channel 33, and which, depending on the position of piston 29 either leads back into chamber 31 or is covered and sealed by piston 29 or lies behind the outside end of piston 29 in an outward open section of the inside of cylinder 30. This arrangement of the outlet opening 32 and channel 33 causes the outlet opening 32 to be released at a defined position of piston 30 during movement of piston 29 into the cylinder 30, and the gas situated inside chamber 31 can then escape into the environment, whereby the pneumatic auxiliary springs 27 and 28 become inactive, i.e., the force $F_3$ exerted on piston 29 is no longer countered by a reaction force.

The force $F_3$ is exerted by piston 4 during its displacement and represents part of the total force exerted by lever 4 on the spring arrangement of pivot bearing 3. Due to the disappearance of the portion of the pneumatic auxiliary springs 27 and 28 during a certain displacement of lever 4, the force of the entire spring arrangement of pivot bearing 3 drops abruptly during this displacement. The pneumatic auxiliary springs 27 and 28 and the mechanical connection of lever 4 thereto are designed in such a way that this drop in spring force occurs during transition from the angular range A to the angular range B of FIG. 1. The abrupt drop in force of the pneumatic auxiliary springs 27 and 28 corresponds in its effect to the connection of a spring having an opposite direction of force to a spring having an unchanged effect at a certain displacement of the latter.

A return spring 34 is shown in FIG. 3, the function of which is to move the piston 29 back to the outer end of cylinder 30 when the force $F_3$ exerted by lever 4 on piston 29 disappears, especially into a position in which the outlet opening again lies within chamber 31 or is at least closed by piston 29 so that the pneumatic springs 27 and 28 regain their effectiveness. The return spring 31 also generates an additional counterforce against the force $F_3$ originating from lever 4, which is also retained after release of the outlet opening 32 and increases with further displacement, but return spring 34 only has a comparatively limited stiffness, which need only be sufficient to move piston 29 back into a rest position after disappearance of force $F_3$. The force of the return spring 34 therefore contributes only very slightly to the overall characteristics of the spring arrangement of pivot bearing 3 in comparison with the force originating from compression of the gas in chamber 31.

An opening 35 in which a valve 36 is arranged is provided in the wall of cylinder 30 in a region that is not covered by the piston in any position of piston 29, for example in the front wall as shown in FIG. 3. This valve 36 is closed during an overpressure in chamber 31 and open during a partial vacuum in chamber 31. Its function consists of permitting inflow of gas, preferably air from the environment, into chamber 31 when the volume of chamber 31 increases by movement of piston 29 as a result of the force of the return spring 34 after disappearance of the force $F_3$ of lever 4. Without valve 36 a partial vacuum would form in chamber 31 when the piston 29 again closes the outlet opening 32 when returning to its rest position so that it would prevent movement into the rest position or would promote undesired high stiffness of the return spring.

According to the disclosure, the pneumatic auxiliary springs 27 and 28 are designed such that the spring characteristic of the entire spring arrangement in sections A and B of the range of movement of lever 4 is nonlinear in the form of a sectionally different spring stiffness, in which the resulting spring stiffness is smaller in section B than in section A. In this case, spring stiffness diminishes abruptly during the transition from area A to area B. This results in an overall degressive spring characteristic.

The embodiment described above represents a practical implementation of such a degressive spring characteristic, but is not the only possibility for this. Another possibility, for example, consists of using a Belleville spring stack as the spring element, since a Belleville spring stack has a degressive spring characteristic. However, the latter operates rather smoothly, i.e., without an abrupt changes in stiffness during a single predetermined displacement.

The disclosure is not restricted to the embodiment described above having a lever 4 that is connected on one end to a holder 6 of a contact element 7 via a pivot bearing 3 with a support 2 and via an additional pivot bearing 5 on the other end. The variability of the distance between the power rail and the moving load along its path of movement could also be achieved by an arrangement of spring-loaded telescoping tubes for connection between the support 2 and the holder 6 of contact element 7. The disclosure could also be used in such a structure with a linear instead of rotational movement of the connection element between support 2 and holder 6, in which case helical springs or evolute springs could be used instead of a torsion spring as spring elements for producing a pressing force of the contact element, in the case of the pneumatic auxiliary springs 27 and 28 described, and conversion of rotational displacement of lever 4 to a linear displacement of piston 29 by a linkage would become unnecessary.

LIST OF REFERENCE NUMBERS

1 Current collector
2 Support
3 First pivot bearing
4 Lever
5 Second pivot bearing
6 Holder
7 Contact element
8 First axis of rotation
9 Second axis of rotation
10 Top
11 Shaft
12 Bearing block
13, 14 Protrusions
15, 16 Brackets
17-24 Stop surface
25, 26 Damping element
27, 28 Auxiliary spring
29 Piston
30 Cylinder
31 Chamber
32 Outlet opening
33 Channel
34 Return spring
35 Opening
36 Valve
$F_0$, $F_3$ Counterforce
$F_1$, $F_2$ Spring force
A, B, C Section of range of movement

What is claimed is:

1. A current collector for power supply to an electrical load movable along a conductor line, the current collector comprising:
   a movable holder for a contact element, whose range of movement is restricted by two mechanical stops and which is acted upon by a spring arrangement exerting a force in the direction of a first end of a range of movement so as to force the contact element against a power rail; and
   a damping device which dampens movement of the holder caused by the spring arrangement in the direction of the first end of the range of movement, when the holder is situated within a predetermined first section of the range of movement, which is restricted on one side by the first end and does not include the entire range of movement,
   wherein a second section is adjoining the predetermined first section of the range of movement of the holder
   wherein a third section is adjoining the second section, the third section extending to a second end of the range of movement that is opposite the first end of the range of movement, and
   wherein stiffness of the spring arrangement in the third section is less than in the second section.

2. The current collector according to claim 1, wherein the damping device is designed in the form of a flow damper or a friction damper.

3. The current collector according to claim 1, wherein the damping device is designed in the form of at least one spring element.

4. The current collector according to claim 1, further comprising:

a first pivot bearing with a first axis, by which a lever is connected between the two mechanical stops so as to rotate with a support fastened to the movable load; and a second pivot bearing with a second axis, by which the holder of the contact element is connected to the lever, the first axis and the second axis lying parallel to each other.

5. The current collector according to claim 4, wherein the spring arrangement acts upon the lever exerting a force in the direction of increasing distance of the holder of the contact element from the support.

6. A current collector for power supply to an electrical load movable along a conductor line, with a movable holder for a contact element, whose range of movement is restricted by two mechanical stops and which is acted upon by a spring arrangement exerting a force in the direction of a first end of a range of movement so as to force the contact element against a power rail, wherein a damping device is provided, which dampens movement of the holder caused by the spring arrangement in the direction of the first end of the range of movement, when the holder is situated within a predetermined first section of the range of movement, which is restricted on one side by the first end and does not include the entire range of movement, wherein a second section is connected to the predetermined first section of the range of movement of the holder and a third section is connected thereto, the third section extending to a second end of the range of movement opposite the first, wherein stiffness of the spring arrangement in the third section is less than in the second section, and wherein the spring arrangement has at least two springs mechanically connected parallel to each other, at least one of which is active over the entire range of movement of the holder and at least one of which is active in the second section of the range of movement of the holder and inactive in the third section.

7. The current collector according to claim 6, wherein the at least two springs have different stiffnesses.

8. The current collector according to claim 6, wherein the at least two springs are pneumatic springs.

9. The current collector according to claim 8, wherein each pneumatic spring has a chamber with a variable volume dependent on the displacement of spring, in which a gas is compressed during a displacement by means of which the spring force is increased, and wherein the chamber has an outlet opening that is open at a predetermined extent of the displacement so that the spring becomes inactive when the predetermined extent of the displacement is surpassed.

10. The current collector according to claim 9, wherein each pneumatic spring has a return spring which moves the pneumatic spring back into a position in which the pneumatic spring is active when the external force ceases to act after release of the outlet opening.

11. The current collector according to claim 9, wherein each pneumatic spring has a valve in a wall that encloses the chamber, which is closed with respect to the environment during an overpressure in the chamber and is open with respect to the environment during a partial vacuum in the chamber.

12. A current collector for power supply to an electrical load movable along a conductor line, with a movable holder for a contact element, whose range of movement is restricted by two mechanical stops and which is acted upon by a spring arrangement exerting a force in the direction of a first end of a range of movement so as to force the contact element against a power rail, wherein a damping device is provided, which dampens movement of the holder caused by the spring arrangement in the direction of the first end of the range of movement, when the holder is situated within a predetermined first section of the range of movement, which is restricted on one side by the first end and does not include the entire range of movement, wherein a second section is connected to the predetermined first section of the range of movement of the holder and a third section is connected thereto, the third section extending to a second end of the range of movement opposite the first, wherein stiffness of the spring arrangement in the third section is less than in the second section, and wherein the spring arrangement has at least one stack of Belleville springs.

* * * * *